(12) United States Patent
Meredith et al.

(10) Patent No.: US 9,627,892 B2
(45) Date of Patent: Apr. 18, 2017

(54) USER CONFIGURABLE ELECTRICAL SUBPANEL SYSTEM WITH BACK FEED PREVENTION

(71) Applicant: SolarWorld Americas Inc., Hillsboro, OR (US)

(72) Inventors: Steven Meredith, Vancouver, WA (US); Nathan Stoddard, Beaverton, OR (US); Chris Stapelmann, Portland, OR (US)

(73) Assignee: SolarWorld Americas Inc., Hillsboro, OR (US)

( * ) Notice: Subject to any disclaimer, the term of this patent is extended or adjusted under 35 U.S.C. 154(b) by 346 days.

(21) Appl. No.: 14/288,465

(22) Filed: May 28, 2014

(65) Prior Publication Data

US 2015/0349530 A1   Dec. 3, 2015

(51) Int. Cl.
*H02J 1/10* (2006.01)
*H02J 3/38* (2006.01)
*H02J 7/35* (2006.01)
*H02H 7/122* (2006.01)
*H02J 3/06* (2006.01)

(52) U.S. Cl.
CPC ............ *H02J 3/383* (2013.01); *H02H 7/1222* (2013.01); *H02J 3/06* (2013.01); *H02J 7/35* (2013.01); *Y02E 10/563* (2013.01); *Y02E 10/566* (2013.01); *Y10T 307/544* (2015.04)

(58) Field of Classification Search
CPC .... H02J 3/383; H02J 7/35; H02J 3/06; H02H 7/1222; Y10T 307/544
USPC .......................................................... 307/51
See application file for complete search history.

(56) References Cited

U.S. PATENT DOCUMENTS

| | | | |
|---|---|---|---|
| 7,648,389 B1 | 1/2010 | Scott et al. | |
| 2008/0144245 A1 | 6/2008 | Fuchik et al. | |
| 2009/0027932 A1* | 1/2009 | Haines | H02J 9/062 363/95 |
| 2010/0034677 A1 | 2/2010 | Uselton | |
| 2010/0127572 A1 | 5/2010 | Uselton et al. | |
| 2011/0176257 A1 | 7/2011 | Uselton et al. | |
| 2012/0235487 A1* | 9/2012 | Bowen | H02J 7/35 307/64 |
| 2014/0104760 A1 | 4/2014 | Uselton et al. | |
| 2015/0162157 A1* | 6/2015 | Luebke | H02J 3/14 307/140 |

(Continued)

OTHER PUBLICATIONS

European Search Report based on Application No. 15 167 807.5 (5 Pages) dated Nov. 20, 2015 (Reference Purpose Only).

(Continued)

*Primary Examiner* — Jared Fureman
*Assistant Examiner* — Duc M Pham
(74) *Attorney, Agent, or Firm* — Viering, Jentschura & Partner mbB (57) ABSTRACT

In various embodiments, an electrical subpanel system is disclosed. The subpanel system may include a DC/AC inverter configured to accept a DC electrical input and to provide an auxiliary AC current output; a quick-disconnect coupling, a busbar connected between the auxiliary AC current output and the quick-disconnect coupling, a receptacle for connecting to at least one electrical device coupled in parallel to said busbar, where the quick-disconnect coupling may be configured to be selectively connected to a mains branch circuit current.

23 Claims, 9 Drawing Sheets

(56) References Cited

U.S. PATENT DOCUMENTS

2016/0181752 A1\* 6/2016 Parks .................. B60R 16/02
439/517

OTHER PUBLICATIONS

U.S. Appl. No. 61/295,941, Timothy J. Brizendine et al.
U.S. Appl. No. 61/224,530, Tim Brizendine et al.
U.S. Appl. No. 61/250,736, Shailesh Manohar et al.
SOLUTRONIC AG, "Solplus Feed-In Solution (FIS)"—More in-house consumption and maximum grid infeed with Feed-In Solution, Sep. 2012, 1 page.

\* cited by examiner

USER CONFIGURABLE ELECTRICAL SUBPANEL SYSTEM WITH BACK FEED PREVENTION

TECHNICAL FIELD

Various embodiments relate generally to a user configurable electrical subpanel system with back feed prevention for connection to an alternative energy source.

BACKGROUND

Implementing alternative energy systems in a residential setting generally requires hiring an electrical contractor to ensure compliance with the relevant municipal electrical and/or construction codes. More particularly, many municipalities, utility companies, and states have strict regulations governing the so-called "backfeed" to the residential power grid of any excess electrical power which may be generated by the alternative energy system. The current disclosure contemplates a user-installable system for managing an alternative energy system and controlling the amount of backfeed from the system to the residential power grid.

SUMMARY

In various embodiments, an electrical subpanel for managing an alternative energy system is provided, where the subpanel manages backfeed and is user-installable.

BRIEF DESCRIPTION OF THE DRAWINGS

In the drawings, like reference characters generally refer to the same elements throughout the different views. The drawings are not necessarily to scale, emphasis is instead generally placed on illustrating the principles of the disclosure. In the following description, various embodiments of the disclosure are described with reference to the following drawings, in which.

DETAILED DESCRIPTION

With the aim of furthering the widespread deployment of alternative energy, and specifically photovoltaic power generation, it is necessary not only to bring down the cost of the solar panel and its installation, but also to make the installation, initialization and commissioning processes easier for the customer, reducing the barriers to entry. To this end, we describe a system with unique features designed to allow a typical customer to install and commission a self-generated power system (e.g. a photovoltaic or PV system) without having to enlist the help of contractors like electricians. There is an additional possibility to avoid the need to obtain permits for interfacing with the utility company. The National Electric Code (NEC) in the US requires any secondary power generation to come into a home power circuit on a dedicated circuit. The reason for this is to avoid overloading a circuit with current from two sources, since the standard circuit breaker at the main control panel will not protect the system in this situation. A typical home has one or more dedicated circuits, operating at the full house voltage (usually 208V), placed for large draw items such as electric clothes dryers, hot tubs and electric ranges. Here, we describe a number of embodiments where an a supplemental power supply is connected to one of these dedicated circuit receptacles through an intermediate device. Several features and configurations will be described in detail, but the overall goal is to provide a plug-and-play interface for a photovoltaic system, wind power generator or other auxiliary power source. In many of these embodiments, a key part is a separate electrical receptacle with the appropriate safety features to allow the original user of the receptacle to be powered (i.e. clothes dryer, hot tub, range, etc.).

A further important feature of many embodiments is the integration of a backfeed prevention feature. With this option, the energy being generated by the auxiliary power source can be managed to assure that the net power generation conducted back into the main electrical grid is either kept at zero or controlled not to exceed some capping value. In one version, this is accomplished by having a measurement from the net home power consumption communicated to the inverter of a PV system so that the inverter can turn down the power being generated when needed. With this feature, the electrical customer can potentially eliminate the need to interface with the utility company or obtain permits, since the only effect to the electric company is a reduction in demand.

The following detailed description refers to the accompanying drawings that show, by way of illustration, specific details and embodiments in which the disclosure may be practiced.

The word "exemplary" is used herein to mean "serving as an example, instance, or illustration". Any embodiment or design described herein as "exemplary" is not necessarily to be construed as preferred or advantageous over other embodiments or designs.

Figure 1:
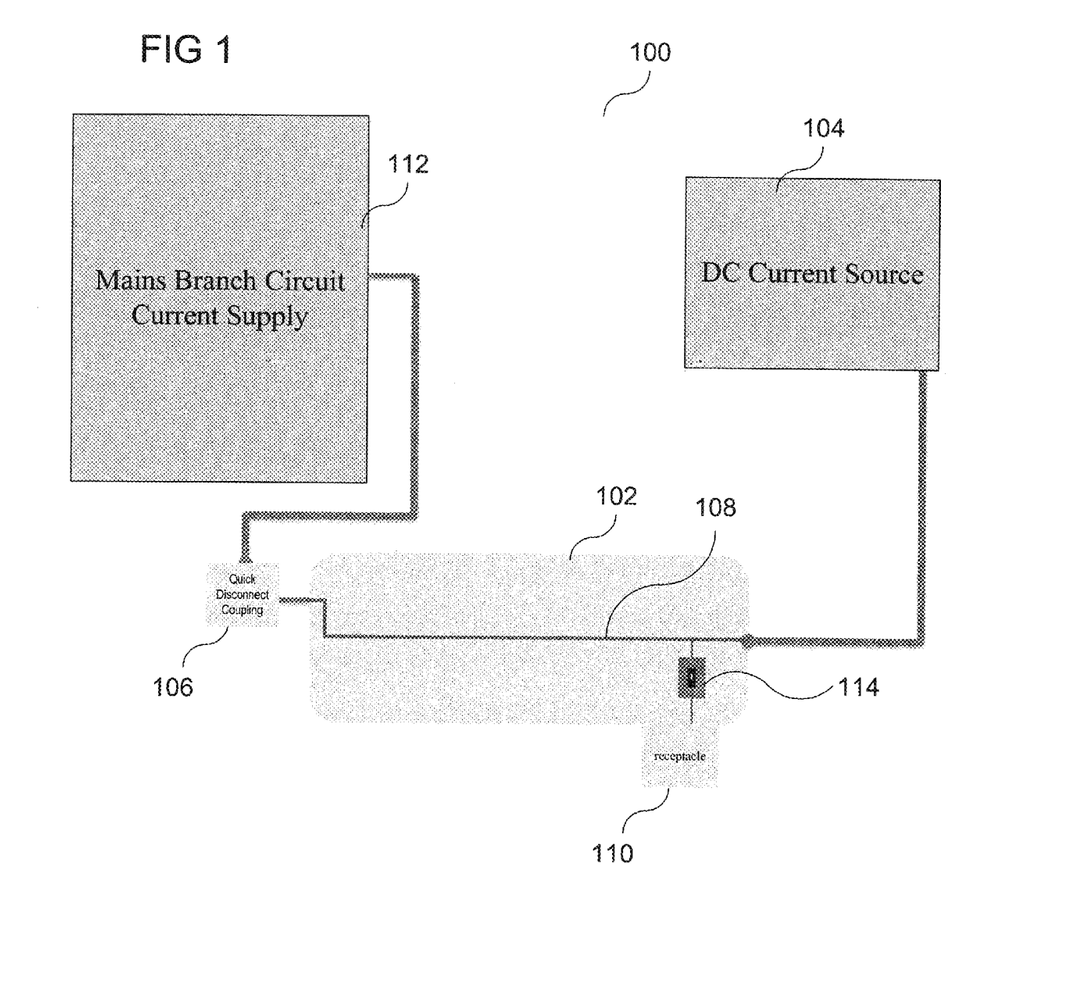
FIG. 1 shows an abstracted view of an alternative energy management system in accordance with various embodiments.

In an exemplary embodiment, as illustrated in FIG. 1, an electrical subpanel system 100 is disclosed. The electrical subpanel system 100 may include a user interface device 102, a direct current ("DC") source 104, a quick-disconnect coupling 106, at least one busbar 108 connected between the direct current source 104 and the quick-disconnect coupling 106, and a receptacle 110 for connecting to at least one electrical device which may be electrically coupled in parallel to the busbar 108. The quick-disconnect coupling may be configured to be selectively connected to a mains branch circuit current supply 112. In various embodiments, the electrical subpanel system 100, may further include a receptacle current limiting device 114 connected between said busbar and said receptacle.

In various embodiments, the electrical subpanel system 100 may include the DC source 104. The DC source 104 may be implemented as a battery, e.g. various multi-galvanic cell lead acid batteries. The DC source 104 may be implemented as an electric generator, such as a dynamo, a unipolar generator, a human powered electrical generator, and various other DC generation sources. In at least one embodiment, the DC source 104 may be a wind-powered generator, e.g. a wind turbine. The DC source 104 may be implemented as a photovoltaic module, e.g. a solar cell. In some embodiments, the DC source may be implemented as various other renewable energy sources, e.g. geothermal, biomass, tidal, etc. According to various embodiments, the DC source may be implemented as any type of DC generation mechanism as may be desirable for a given application.

In exemplary embodiments, the electrical subpanel system 100 may include the quick-disconnect coupling 106. The quick-disconnect coupling 106 may be an electrical plug configured to electrically and mechanically couple with an electrical receptacle. In various embodiments, the quick-disconnect coupling 106 may be implemented as various standardized electrical couplings, e.g. for applications in North America, such as electrical couplings approved by the National Electrical Manufacturers Association ("NEMA"). In some exemplary embodiments, the quick-disconnect coupling 106 may be implemented as various "straight-blade" NEMA approved electrical couplings, such as any of the NEMA 5-15, 5-20, 5-30, 5-50, 10-20, 10-30, 10-50, 14-20, 14-30, 18-15, 18-20, 18-30, and 18-50 style couplings. According to various embodiments, the quick-disconnect coupling 106 may be implemented as a grounded electrical coupling. In at least one embodiment, the quick-disconnect coupling 106 may be implemented as an ungrounded electrical coupling. The quick-disconnect coupling 106 may be a multi-pole electrical coupling, e.g. a two-pole electrical coupling, e.g. a three-pole electrical coupling, e.g. a four-pole electrical coupling, etc. In an exemplary embodiment, the quick-disconnect coupling 106 may be implemented as a locking and/or "curved-blade" electrical coupling. According to various embodiments, the quick-disconnect coupling 106 may be either a locking or non-locking electrical coupling. In various other embodiments, the quick-disconnect coupling 106 may be implemented as various other standardized electrical couplings, e.g. for applications in Europe, such as electrical couplings approved by the International Commission on the Rules for the Approval of Electrical Equipment ("IECEE") and/or the so called "CB Scheme". In some embodiments, the quick-disconnect coupling 106 may be implemented as various standardized British electrical couplings, e.g. BS 546 and BS 1363. In various other embodiments, the quick-disconnect coupling 106 may be implemented as various other standardized electrical couplings, e.g. electrical couplings approved by the International Electrotechnical Commission ("IEC") such as various types of the AS/NZS 3112 electrical coupling. The quick-disconnect coupling 106 may be implemented as various other types of standardized electrical couplings, for example coupling approved under the Chinese Compulsory Product Certification System ("CPCS") such as the CPCS-CCC Type I electrical coupling. In some embodiments, the quick-disconnect coupling 106 may be implemented as any style of electrical coupling as may be desired for a given application.

In various embodiments, the electrical subpanel system 100 may include the at least one busbar 108. In various embodiments, the at least one busbar 108 may be configured to receive electrical energy from the DC source 104. In some embodiments, the at least one busbar 108 may be configured to conduct electrical energy from the DC source 104 to the quick-disconnect coupling 106. According to various embodiments, the at least one busbar 108 may be configured to receive electrical energy from the quick-disconnect coupling 106. In an exemplary embodiment, the at least one busbar 108 may be configured to transmit electrical energy from the quick-disconnect coupling 106 and/or the DC source 104 to the receptacle 110. The at least one busbar 108 may be composed of or may include various electrically conductive materials, e.g. a metalized structure, an elemental metal, various metal alloys. The at least one busbar 108 may be composed of or may include, for example, aluminum, silver, copper, gold, nickel, aluminum-silver and cupronickel. In some embodiments, the at least one busbar 108 may be implemented as an electrically conductive wire, such as a copper or aluminum wire of various sizes as may be appropriate for a given application. In some embodiments, the at least one busbar 108 may be implemented as a plurality of busbars and/or wires.

In some embodiments, the electrical subpanel system 100 may include the receptacle 110. The receptacle 110 may be configured to receive electrical energy from at least one of the quick-disconnect coupling 106 and the DC source 104. In some embodiments, the receptacle 110 may be configured to receive electrical energy from both the quick-disconnect coupling 106 and the DC source 104 simultaneously. According to various embodiments the receptacle 110 may be configured to transmit electrical energy to a residential electrical appliance, e.g. such as an electric clothes dryer or refrigerator. In various embodiments, the receptacle 110 may be implemented as any number of electrical receptacles, such as the standardized receptacles discussed at length above, e.g. NEMA, IECEE, IEC, CPCS, etc.

In some embodiments, the electrical subpanel system 100 may include the mains branch circuit current supply 112. In various embodiments, the mains branch circuit current supply 112 may be configured to supply electrical energy to the quick-disconnect coupling 106. In some embodiments, the mains branch circuit current supply 112 may be configured to receive electrical energy from the quick-disconnect coupling 106. The mains branch circuit current supply 112 may be implemented as a residential branch connected to a residential mains circuit, e.g. a branch circuit implemented in a main residential circuit breaker box. In various embodiments, the mains branch circuit current supply 112 may be implemented as a residential dedicated branch circuit, e.g. a branch circuit dedicated to power one high current load such as an electric range, electric clothes dryer, or various other typical residential appliances. In some embodiments, the mains branch circuit current supply 112 may be permanently coupled to a mains branch circuit current, e.g. a so-called "hard-wired" electrical connection. In various embodiments, the mains branch circuit current supply 112 may be temporarily and/or removably coupled to a mains branch circuit current, e.g. the connection may be accomplished by various temporary extension leads and/or extension cords.

In some embodiments, the electrical subpanel system 100 may include the receptacle current limiting device 114. According to various embodiments, the receptacle current limiting device 114 may be electrically interposed between the busbar 108 and the receptacle 110. The receptacle current limiting device 114 may be capable of limiting the amount of electrical current supplied to the receptacle 110, by either the quick-disconnect coupling 106 or the DC source 104, below a predetermined maximum current. In various embodiments, the predetermined maximum current may be in the range from about 10 amperes ("A") to about 100 A; e.g. in the range from about 10 A to about 15 A; e.g. in the range from about 15 A to about 20 A; e.g. in the range from about 20 A to about 30 A; e.g. in the range from about 30 A to about 50 A; e.g. in the range from about 50 A to about 100 A. According to various embodiments, the receptacle current limiting device 114 may be implemented as a type of fusible electrical connection, e.g. various types of commercially available fuses as may be appropriate for a given application. In some embodiments, the receptacle current limiting device 114 may be implemented as a type of automatic electrical switch, e.g. a circuit breaker.

Figure 2:
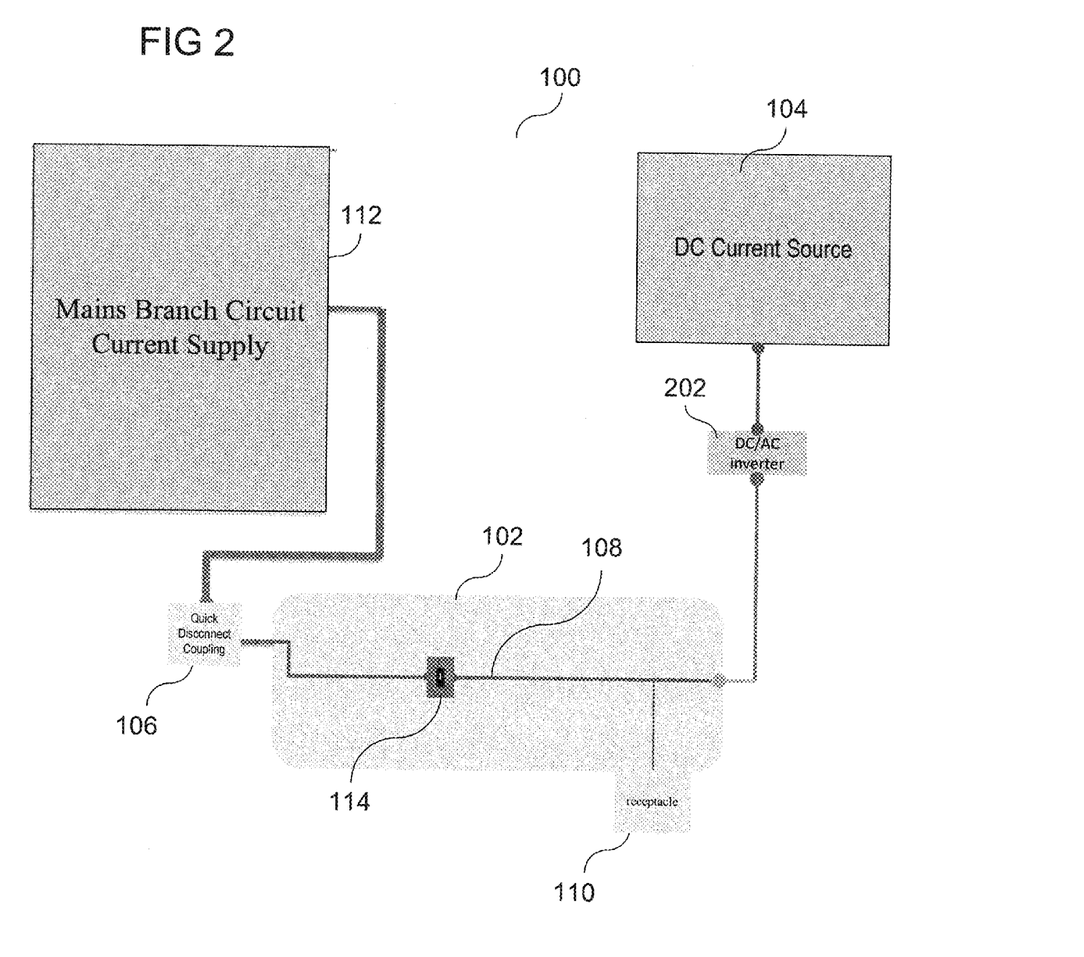
FIG. 2 shows an exemplary embodiment of the alternative energy management system in FIG. 1 implemented with a string inverter, in accordance with various embodiments.

According to various embodiments, as illustrated in FIG. 2, the electrical subpanel system 100 may further include an inverter 202 for converting direct electrical current to alternating electrical current ("DC/AC") which may be configured to accept a DC input and to provide an AC output. According to various embodiments, the inverter 202 may be configured to accept an DC voltage and to output an AC voltage. In embodiments where the inverter may be configured to output an AC voltage, the AC voltage may be in the range from about 100 VAC to about 250 VAC, e.g. in the range from about 100 VAC to about 125 VAC, e.g. in the range from about 125 VAC to about 150 VAC, e.g. from about 150 VAC to about 175 VAC, e.g. from about 175 VAC to about 200 VAC, e.g. from about 200 VAC to about 225 VAC, e.g. from about 225 VAC to about 250 VAC. The inverter 202 may be configured to accept a DC current and to output an AC current. The inverter 202 may be configured to accept a DC current in the range from about 1 A to about 50 A, e.g. in the range from about 1 A to about 5 A, e.g. in the range from about 5 A to about 10 A, e.g. in the range from about 10 A to about 15 A, e.g. in the range from about 15 A to about 20 A, e.g. in the range from about 20 A to about 25 A, e.g. in the range from about 25 A to about 30 A, e.g. in the range from about 30 A to about 35 A, e.g. in the range from about 35 A to about 40 A, e.g. in the range from about 40 A to about 45 A, e.g. in the range from about 45 A to about 50 A. The inverter 202 may be configured to provide an AC current output. In various embodiments, the AC current output of the inverter 202 may be of various waveforms as may be desired for a given application, e.g. a square wave, a sine wave, a modified sine wave, and a pulsed sine wave. The AC current output of the inverter 202 may be of various frequencies as may be appropriate for a given application, e.g. 50 Hz and 60 Hz. In some embodiments the inverter 202 may be permanently coupled to the at least one busbar 108, e.g. a so-called "hard-wired" electrical connection. In various other embodiments, the inverter 202 may be selectively coupled to the at least one busbar 108, e.g. connected through a quick-disconnect coupling.

Figure 3:
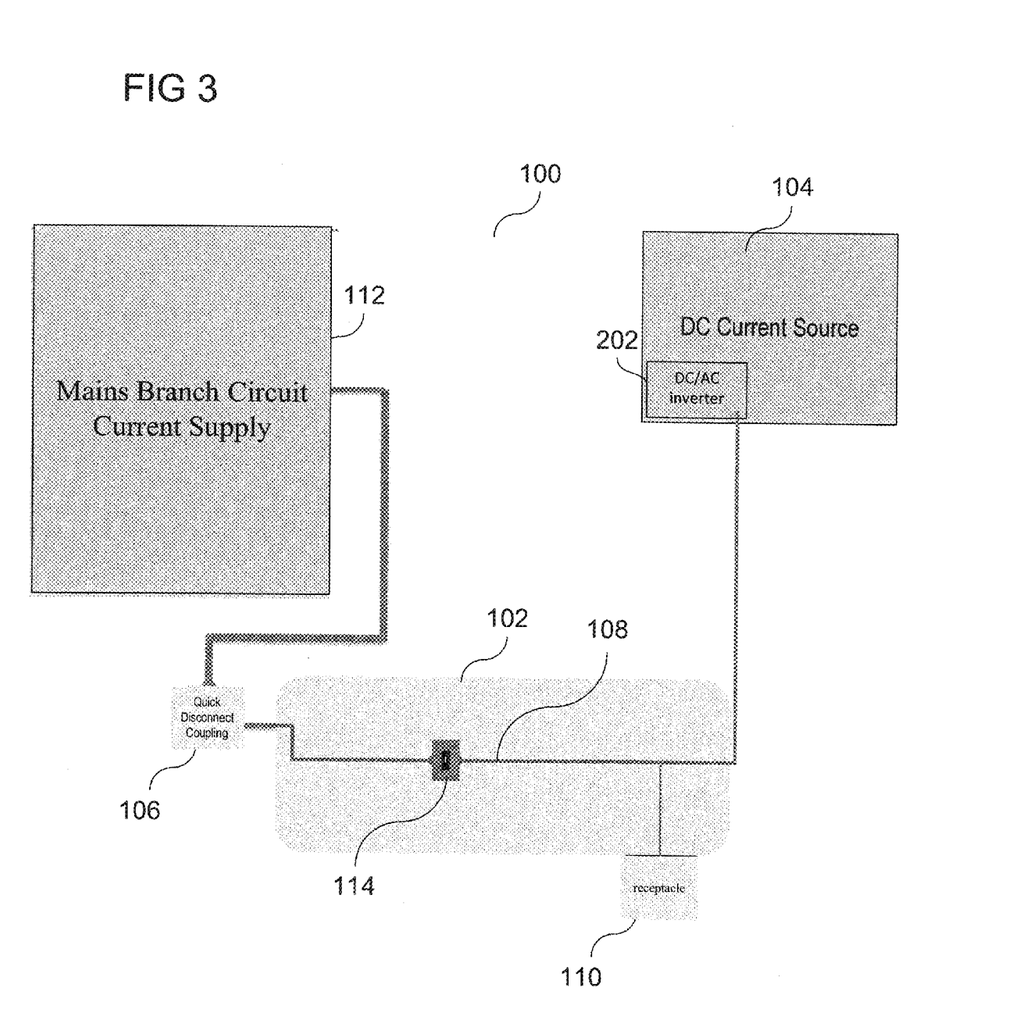
FIG. 3 shows an exemplary embodiment of the alternative energy management system in FIG. 1 implemented with a microinverter, in accordance with various embodiments.

In various embodiments, as illustrated in FIG. 3, the inverter 202 may be attached and/or may be an integral component of the DC current source 104. In embodiments where the DC current source 104 may be implemented as a photovoltaic module, the inverter 202 may be implemented as a microinverter which may be attached and/or mounted to the photovoltaic module.

Figure 4:
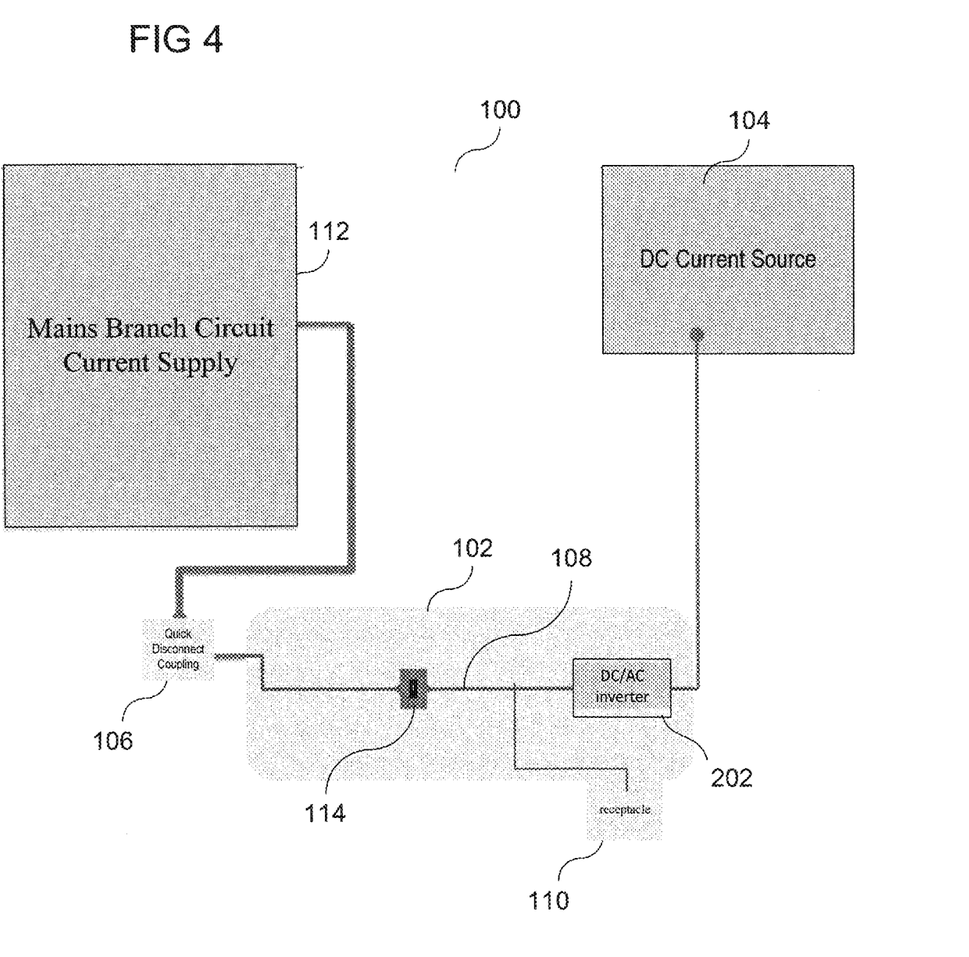
FIG. 4 shows an alternative exemplary embodiment of the alternative energy management system in FIG. 2, in accordance with various embodiments.

In various embodiments, as illustrated in FIG. 4, the inverter 202 may be a discrete and/or separate component from the DC current source 104. In some embodiments the inverter 202 may be an integral component of the user interface device 102. In various embodiments where the inverter 202 may be integrated into the user interface device 102, the inverter 202 may be implemented as a so-called "string inverter".

Figure 5:
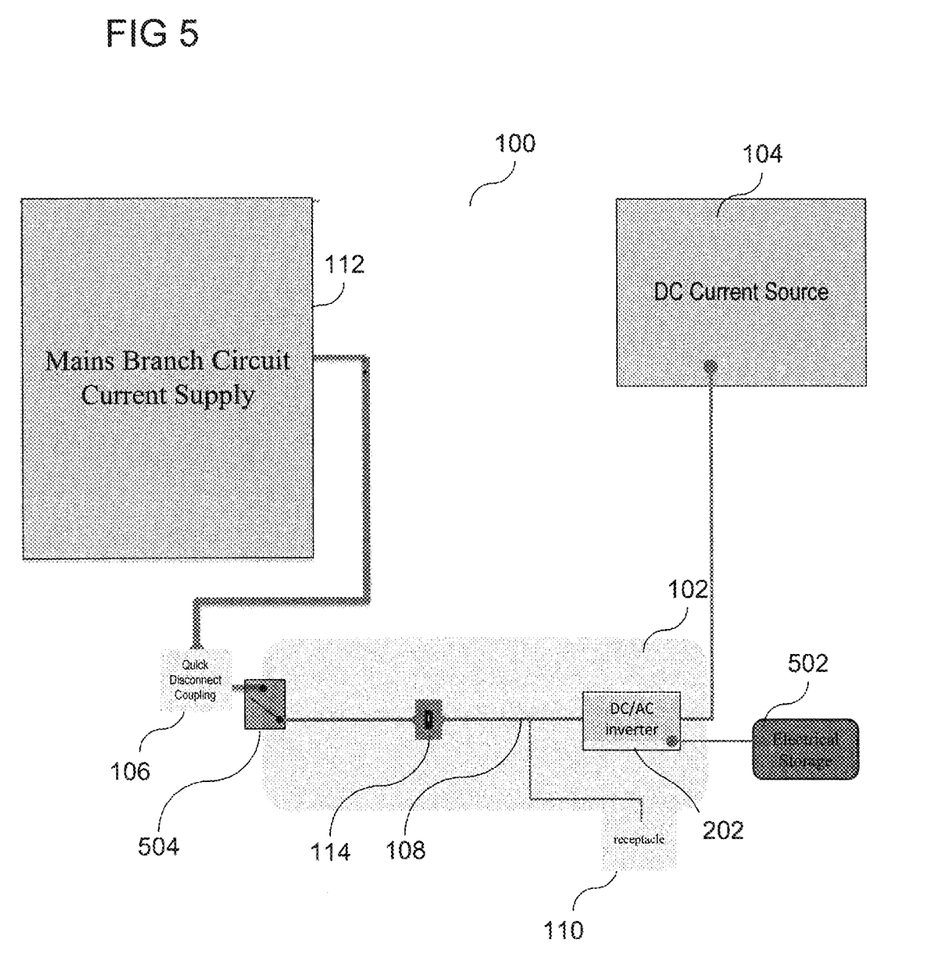
FIG. 5 shows an exemplary embodiment of the alternative energy management system in FIG. 1 implemented with an electrical energy storage system, in accordance with various embodiments.

In various embodiments, as illustrated in FIG. 5, the electrical subpanel system 100 may further include an electrical energy storage system 502. The electrical energy storage system 502 may be configured to supply electrical energy to the at least one busbar 108. In some embodiments, the electrical energy storage system 502 may be configured to receive electrical energy from the DC current source 104 and to store said energy. According to at least one embodiment, the electrical energy storage system 502 may be implemented as a battery, e.g. various types of secondary cell and/or rechargeable batteries, e.g. various wet cell, dry cell, molten salt, lithium ion polymer, nickel metal hydride, lead-acid, nickel cadmium, valve regulated lead-acid battery, and lithium ion batteries and/or battery systems as may be desirable for a given application. In some embodiments, the electrical energy storage system 502 may be implemented as various other rechargeable energy storage systems, e.g. a flywheel, a capacitive storage system, a compressed air energy storage system, a pumped-storage hydroelectric system, and a thermal energy storage system, etc. The electrical energy storage system 502 may be implemented as a type of energy storage system as may be desirable for a given application.

In various embodiments, as illustrated in FIG. 5, the electrical subpanel system 100 may further include a main system switch 504. The main system switch 504 may be configured to electrically disconnect and/or isolate the user interface device 102 from the quick disconnect coupling 106.

Figure 6:
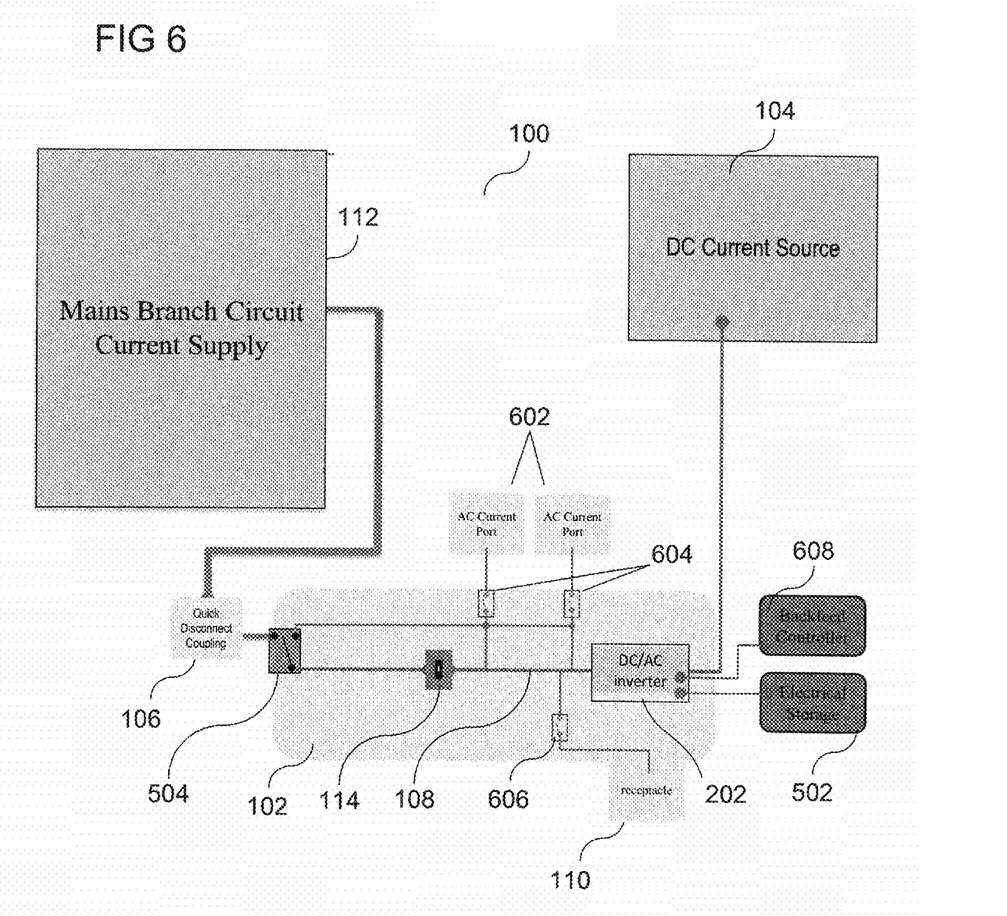
FIG. 6 shows an exemplary embodiment of the alternative energy management system in FIG. 5 implemented with a backfeed controller, in accordance with various embodiments.

In various embodiments, as illustrated in FIG. 6, the electrical subpanel system 100 may further include a plurality of AC ports 602. The plurality of AC ports 602 may be configured to receive electrical energy from the at least one busbar 108. In some embodiments, the plurality of alternating current ports 602 may be configured to receive electrical energy from inverter 202 via the at least one busbar 108. In some embodiments, the plurality of AC ports 602 may receive electrical energy via either the DC source 104 or the electrical energy storage system 502. According to various embodiments the plurality of AC ports 602 may be configured to transmit electrical energy to a variety of residential electrical appliances, e.g. such as televisions, radios, cellular telephone charging systems, etc. In various embodiments, the plurality of AC ports 602 may be implemented as any number of electrical receptacles, such as the standardized receptacles discussed at length above, e.g. NEMA, IECEE, IEC, CPCS, etc. In some embodiments, the plurality of AC ports 602 may each be equipped with an AC disconnect switch 604. According to various embodiments, the AC disconnect switch 604 may be implemented as a type of current limiting device, which may be capable of preventing the amount of current supplied to the plurality of AC ports 602 from exceeding a predetermined threshold, e.g. in the range from about 10 A to about 300 A, as may be desired for a given application. In various exemplary embodiments, the AC disconnect switch 604 may be implemented as a type of fusible electrical connection, e.g. various types of commercially available fuses as may be desirable for a given application, e.g. a type of automatic electrical switch such as a circuit breaker. In at least one embodiment, the main system switch 504 may be configured to electrically disconnect and/or isolate the user interface device 102 from the quick disconnect coupling 106, while simultaneously providing electrical energy to the plurality of AC ports 602. In an embodiment where the user interface device 102 may be isolated from the quick disconnect coupling 106 by the main system switch 504, the plurality of AC ports 602 may be configured to receive and/or draw electrical energy from either the DC source 104 or the electrical energy storage system 502 via the inverter 202 and the at least one busbar 108. In an embodiment where the user interface device 102 may be isolated from the quick disconnect coupling 106 by the main system switch 504, the plurality of AC ports 602 may be configured to receive and/or draw electrical energy from both the DC source 104 and the electrical energy storage system 502 simultaneously via the inverter 202 and the at least one busbar 108.

In various embodiments, as illustrated in FIG. 6, the electrical subpanel system 100 may further include a receptacle current limiting device 606, which may be interposed between the at least one busbar 108 and the receptacle 110. In various exemplary embodiments, the receptacle current limiting device 606 may be implemented as a type of fusible electrical connection, e.g. various types of commercially available fuses as may be desirable for a given application, e.g. a type of automatic electrical switch such as a circuit breaker. According to various embodiments, the receptacle current limiting device 606 may be implemented as a type of current limiting device, which may be capable of preventing the amount of current supplied to receptacle 110 from exceeding a predetermined threshold, e.g. in the range from about 10 A to about 300 A, as may be desired for a given application.

In various embodiments, as illustrated in FIG. 6, the electrical subpanel system 100 may further include a backfeed controller 608. In various embodiments, the backfeed controller 608 may be capable of dynamically regulating the output of the DC current source 104. In some embodiments, the backfeed controller 608 may be capable of regulating the electrical current carried by the at least one busbar 108. In some embodiments, the current carried by the at least one busbar 108 may be denoted as $i_{Total}$, where $i_{total}$ is defined by the relation ($i_{Mains}+i_{Aux}=i_{Total}$) and $i_{Mains}$ may be the current of mains branch circuit current supply 112 and $i_{Aux}$ may be the current output by the inverter 202.

Figure 7:
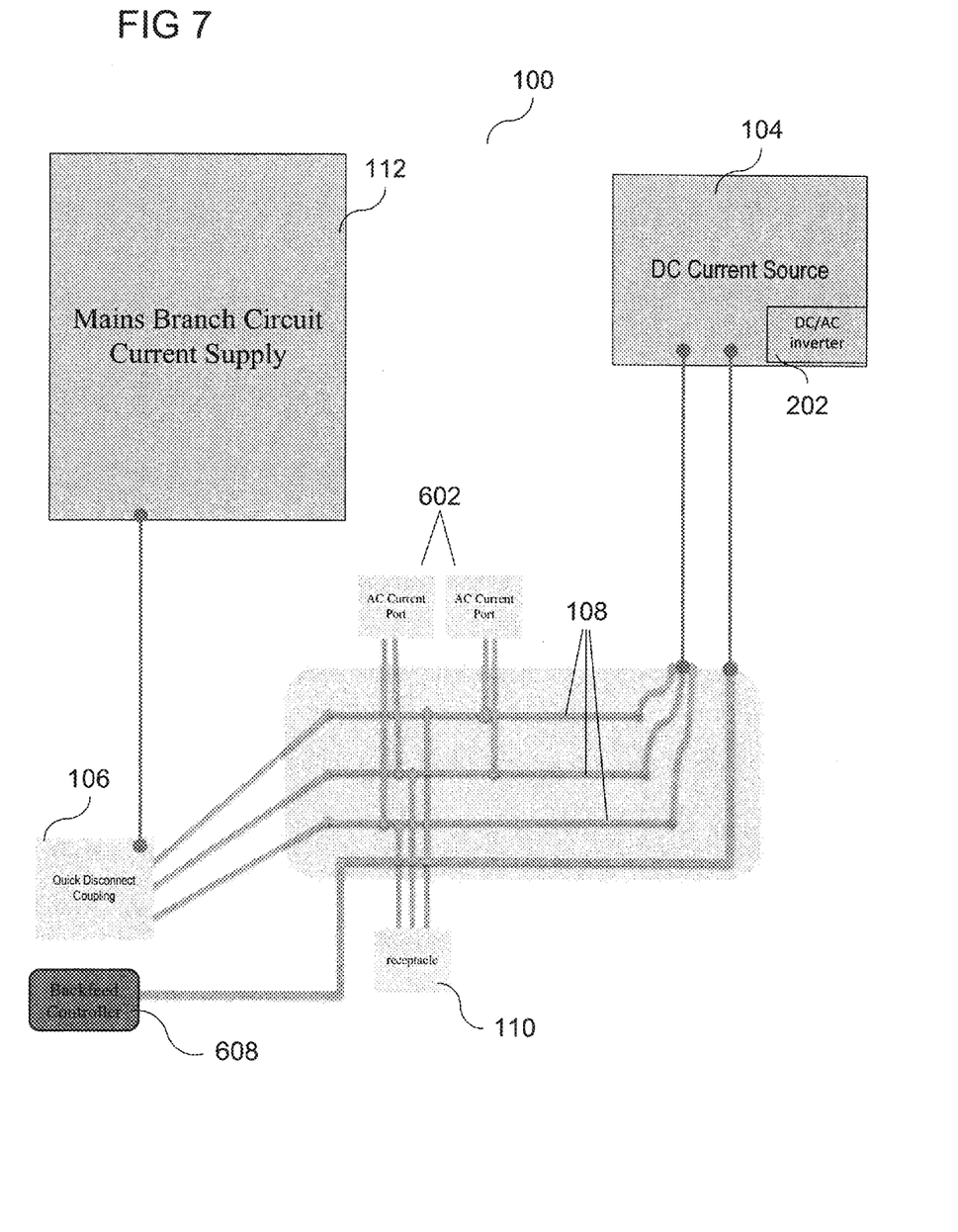
FIG. 7 shows an alternative exemplary embodiment of the alternative energy management system in FIG. 6, implemented with a microinverter, in accordance with various embodiments.

In various embodiments, as illustrated in FIG. 7, the backfeed controller 608 may be located outside and/or may be a discrete component from the user interface device 102. In some embodiments, the backfeed controller 608 may regulate the output of the DC current source 104 by providing a control signal to the inverter 202. The inverter 202, may then process the control signal from the backfeed controller 608 and use the information contained in the control signal to dynamically control the output of the DC current source 104. In an exemplary embodiment, the control signal could be implemented as a varying voltage supplied by the backfeed controller 608, e.g. a voltage in the range from about 0V to about 10V. According to an embodiment, the control signal could be implemented as a varying current supplied by the backfeed controller 608, e.g. a current in the range from about 4 mA to about 20 mA. In the exemplary embodiment depicted in FIG. 7, the inverter 202 is implemented as a microinverter mounted and or integrated with the DC current source 202. In an embodiment where microinverters may be utilized, such as in FIG. 7, the backfeed controller 608 may supply the control signal directly to the microinverters.

Figure 8:
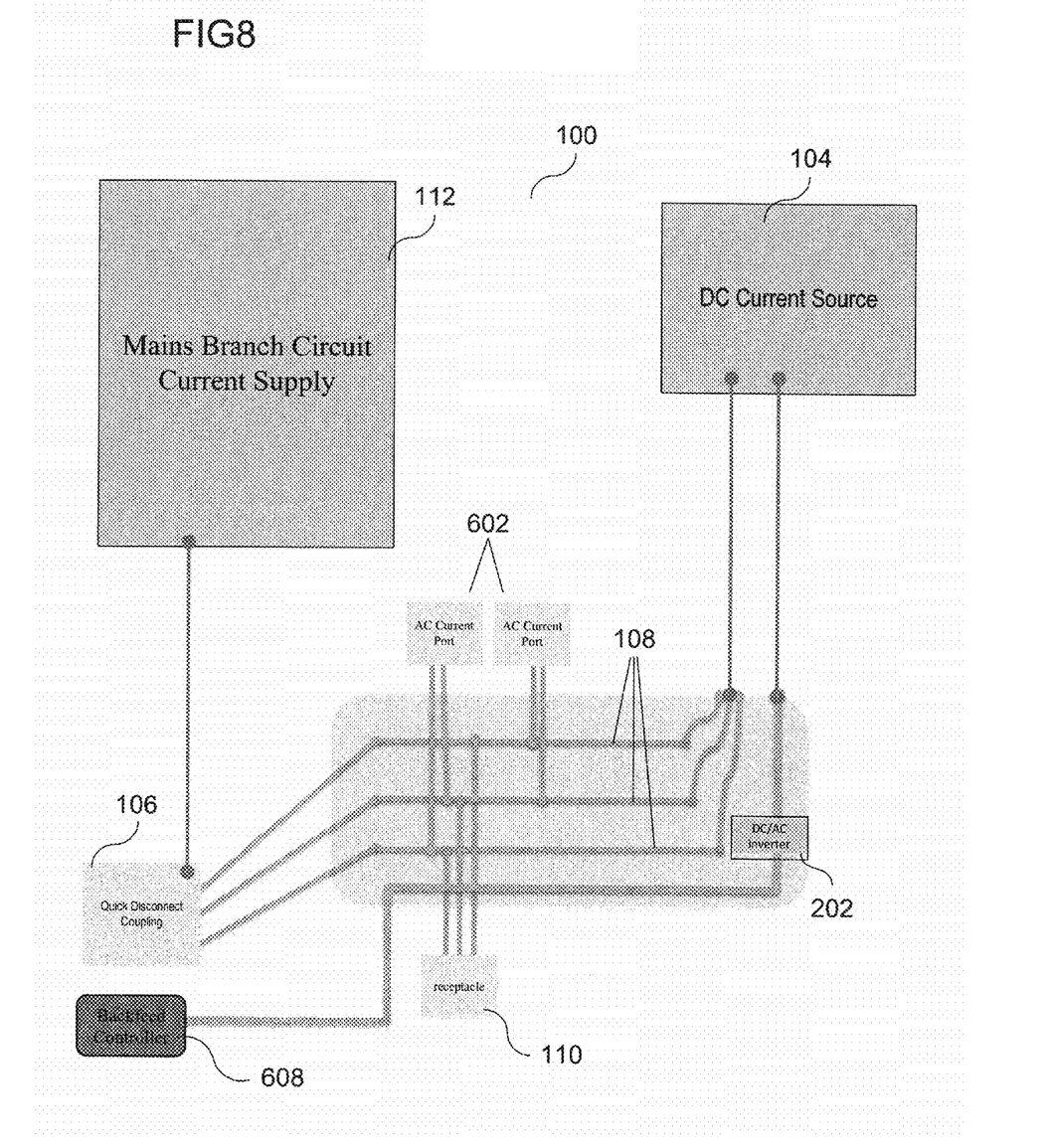
FIG. 8 shows an alternative exemplary embodiment of the alternative energy management system in FIG. 7, implemented with a string inverter, in accordance with various embodiments.

In various embodiments, as illustrated in FIG. 8, where the inverter 202 may be implanted as a string inverter, the backfeed controller 608 may supply the control signal to the inverter 202. The inverter 202 may then regulate the output of the DC current source 104, e.g. by managing the operating voltage of the PV system in a range between the voltage of maximum power and the open circuit voltage.

Figure 9:
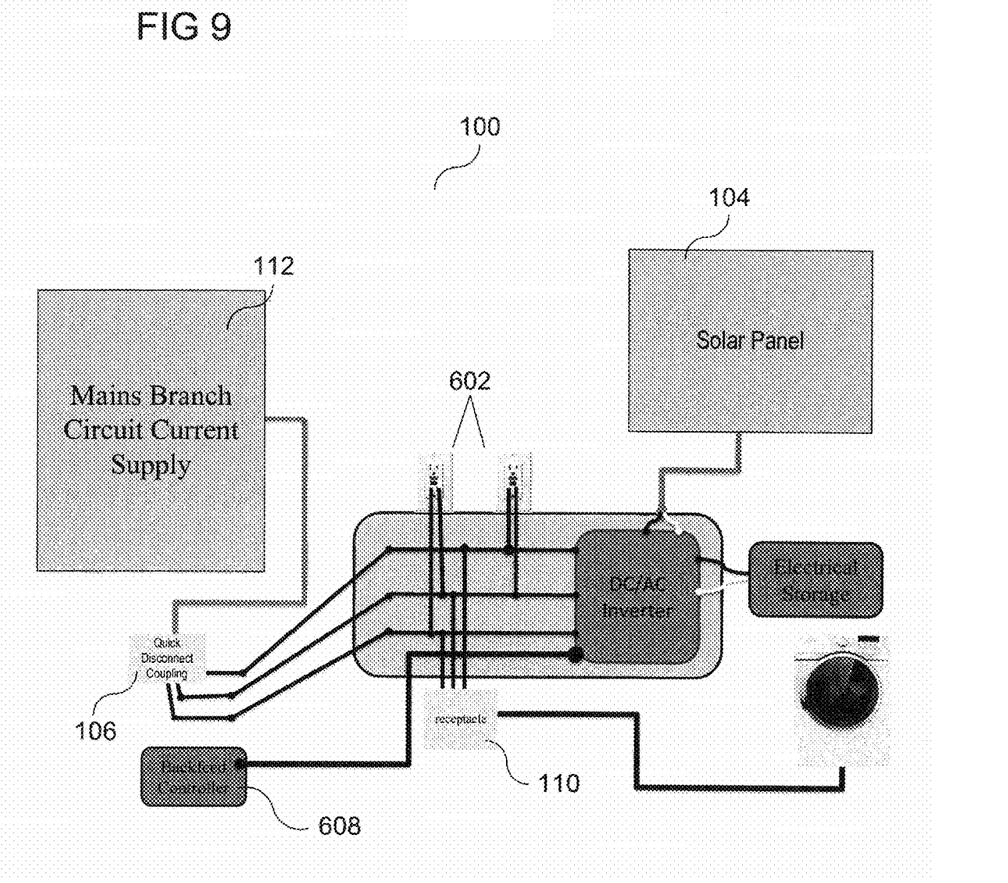
FIG. 9 shows an alternative exemplary embodiment of the alternative energy management system in FIG. 1, in accordance with various embodiments.

According to an embodiment, as illustrated in FIG. 9, where the DC current source 104 may be implemented as a solar panel, and the inverter 202 may be implemented as a string inverter, the control signal may be implemented according to the relation V (inverter)=Voc−(Voc−Vmp)/(2−0.5)*(Vsig−0.5), where Voc may be the open circuit voltage of the solar panel, Vmp may be the voltage at which the solar generates its maximum power output, and Vsig may be the voltage of the control signal. In an exemplary embodiment as depicted in FIG. 9, where the control signal voltage may be above about 2V, the inverter 202 may be configured to hold the voltage of the solar panel at the level to achieve maximum power output (Vmp). Similarly, in an embodiment where the control signal may be below about 0.5V, the inverter 202 may be configured to control the solar panel to operate at open circuit voltage (Voc), where no power would be generated by the solar panel. In a further embodiment, where the controller voltage may be between about 0.5V and about 2V, the voltage of the solar panel may be controlled linearly between Voc and Vmp. In another embodiment, the control signal may be a current supplied by the backfeed controller 608.

In at least one embodiment, as illustrated in FIG. 9, the mains branch circuit current supply 112 may be implemented as a residential electrical distribution board, e.g. a home breaker panel. According to an embodiment, the quick disconnect coupling 106 may be implemented as a residential electrical receptacle, e.g. a receptacle which may be used to power a residential electric clothes dryer or electric cooking range such as a NEMA 10-30, NEMA 10-50, NEMA 14-30, and NEMA 14-50. In various embodiments, the DC current source 104 may be implemented as a solar panel or a plurality of solar panels. Further, in an embodiment, the receptacle 110 may likewise be a residential electrical receptacle, e.g. a NEMA 10-30, NEMA 10-50, NEMA 14-30, and NEMA 14-50. In an exemplary embodiment, the electrical subpanel system 100 may be implemented as a so-called "plug and play" system which may allow an end user to install an alternative power generation system to supplement and/or supplant the electric power supplied by a residential electrical utility connection. In some embodiments, the user interface device 102 may be and/or may contain a control system to prevent the alternative power generation system from accidentally overloading a dedicated branch circuit of a residential domicile where the electrical subpanel system 100 may be implemented. Further, the user interface device 102 may be implemented to prevent any electrical energy generated by the alternative power generation system from feeding electrical power back to the residential electrical utility connection. In various embodiments, the plurality of AC ports 602 may be implemented as "convenience" poweroutlets, e.g. outlets to power electric devices in situations where electricity is unavailable from the residential electrical utility connection.

The following examples pertain to further exemplary embodiments.

In Example 1, an electrical subpanel system is disclosed. The electrical subpanel system may include a DC/AC inverter which may be configured to accept a DC electrical input and to provide an auxiliary AC current output; a quick-disconnect coupling; a busbar which may be connected between the auxiliary AC current output and the quick-disconnect coupling; a receptacle for connecting to at least one electrical device coupled in parallel to said busbar; where the quick-disconnect coupling may be configured to be selectively connected to a mains branch circuit current.

In Example 2, the electrical subpanel system of Example 1 may further include a receptacle current limiting device connected between said busbar and said receptacle.

In Example 3, the electrical subpanel system of Example 2, where the inverter may be hard-wired to the busbar.

In Example 4, the electrical subpanel system of Example 1 may further include a branch circuit current limiting device interposed between the quick-disconnect coupling and the mains branch circuit current.

In Example 5, the electrical subpanel system of Example 1 may further include a plurality of mains branch circuits; where each of the said plurality of mains branch circuits may include a branch circuit current limiting device interposed between a quick-disconnect coupling and the mains branch circuit current.

In Example 6, the electrical subpanel system of Example 4, where the branch circuit current limiting device may be provided within a mains electrical panel, the mains electrical panel may include a main panel busbar; and a mains current supply; where said main panel busbar may be connected between the branch circuit current limiting device.

In Example 7, the electrical subpanel system of Example 6 may further include a backfeed controller connected to said inverter, the backfeed controller may have a current monitoring apparatus coupled to the mains branch circuit current.

In Example 8, the electrical subpanel system of Example 7, where the backfeed controller may generate a signal for controlling an output of the inverter.

In Example 9, the electrical subpanel system of Example 8, where the net current backfeed from the inverter to said mains branch circuit current supply may be controlled to be zero.

In Example 10, the electrical subpanel system of Example 8, where the net current backfeed from the inverter to said mains branch circuit current supply may be controlled to be between zero and a maximum current rating for said branch circuit.

In Example 11, the electrical subpanel system of Example 8, where net system backfeed to a utility tie-in may be controlled to be zero.

In Example 12, the electrical subpanel system of Example 6 may further include a backfeed controller connected to said inverter, the backfeed controller may have a current monitoring apparatus coupled to the mains electrical panel tie-in.

In Example 13, the electrical subpanel system of Example 12, where the backfeed controller may generate a signal for controlling an output of the inverter.

In Example 14, the electrical subpanel system of Example 13, where the net current backfeed from the inverter to said mains electrical panel tie-in may be controlled to be zero.

In Example 15, the electrical subpanel system of Example 13, where the net current backfeed from the inverter to said mains electrical panel tie-in may be controlled to be between zero and a predetermined backfeed current limit.

In Example 16, the electrical subpanel system of Example 6 may further include a main switch to disconnect said main panel busbar from said mains branch circuit current supply.

In Example 17, the electrical subpanel system of Example 16, where said main switch may be open until a mains voltage is present at said quick-disconnect coupling.

In Example 18, the electrical subpanel system of Example 1, where the busbar may be configured to conduct an electrical current, $i_{Total}$, where $i_{Total}$ is defined by the relation ($i_{Total}=i_{Mains}+i_{Aux}$) and $i_{Mains}$ is the mains branch circuit current and $i_{Aux}$ is the current output by the inverter.

In Example 19, the electrical subpanel system of Example 18, where the current $i_{Total}$ may be less than or equal to 30 amps.

In Example 20, the electrical subpanel system of Example 1, where the DC electrical input to the inverter may be supplied by a primary power source.

In Example 21, the electrical subpanel system of Example 20, where the primary power source may be at least one of a photovoltaic system, a wind turbine, a geothermal system, a hydrogen fuel cell, a biofuel system, and a tidal energy system.

In Example 22, the electrical subpanel system of Example 20, where the DC electrical input to the inverter is supplied by a secondary power source.

In Example 23, the electrical subpanel system of Example 22, where the secondary power source may be an electrical energy storage system.

In Example 24, the electrical subpanel system of Example 23, where the secondary power source may be at least one of a battery, a flywheel, a capacitive storage system, a compressed air energy storage system, a pumped-storage hydroelectric system, and a thermal energy storage system.

In Example 25, the electrical subpanel system of Example 22, where the DC electrical input to the inverter may be supplied by one of the primary power source or the secondary power source.

In Example 26, the electrical subpanel system of Example 15, where the mains electrical panel tie-in may be an electrical utility tie-in.

In Example 27, the electrical subpanel system of Example 1, where the system may be configured to match the maximum voltage of the branch circuit to which it is connected.

In Example 28, an electrical subpanel system, which may include an electrical input configured to accept an auxiliary AC current; a quick-disconnect coupling; a busbar connected between the electrical input and the quick-disconnect coupling; a receptacle for connecting to at least one electrical device coupled in parallel to said busbar; where the quick-disconnect coupling may be configured to be selectively connected to a mains branch circuit current.

In Example 29, the electrical subpanel system of Example 28 may further include at least one solar panel; a DC/AC inverter connected to an output of the solar panel, which may be configured to accept a DC electrical input from said solar panel and to provide the auxiliary AC current; and at least one backfeed measurement circuit; where the electrical subpanel system may be configured to be electrically coupled to a dedicated branch circuit of a mains circuit such that a maximum current rating for said dedicated branch circuit is not exceeded.

In Example 30, the electrical subpanel system of Example 28 may further include a receptacle current limiting device connected between said busbar and said receptacle.

In Example 31, the electrical subpanel system of Example 30, where the inverter may be hard-wired to the busbar.

In Example 32, the electrical subpanel system of Example 28 may further include a branch circuit current limiting device interposed between the quick-disconnect coupling and the mains branch circuit current.

In Example 33, the electrical subpanel system of Example 32, where the backfeed measurement circuit may enable a net-metering configuration.

In Example 34, the electrical subpanel system of Example 32, where the branch circuit current limiting device may be provided within a mains electrical panel, the mains electrical panel may include a main panel busbar and a mains current supply; where said main panel busbar may be connected between the branch circuit current limiting device.

In Example 35, the electrical subpanel system of Example 29 may further include a backfeed controller connected to the backfeed measurement circuit; where the backfeed measurement circuit may be coupled to the mains branch circuit.

In Example 36, the electrical subpanel system of Example 34, where the backfeed controller may generate a signal for controlling an output of the inverter.

In Example 37, the electrical subpanel system of Example 34, where the net current backfeed from the DC/AC inverter to said mains branch circuit current supply may be controlled to be zero.

In Example 38, the electrical subpanel system of Example 34, where the net current backfeed from the DC/AC inverter to said mains branch circuit current supply may be controlled to be between zero and a maximum current rating for said branch circuit.

In Example 39, the electrical subpanel system of Example 34, where the net current backfeed from the inverter to said mains electrical panel tie-in may be controlled to be zero.

In Example 40, the electrical subpanel system of Example 34, where the net current backfeed from the inverter to said mains electrical panel tie-in may be controlled to be between zero and a predetermined backfeed current limit.

In Example 41, the electrical subpanel system of Example 28, where the net system backfeed to a utility tie-in may be controlled to be zero.

In Example 42, the electrical subpanel system of Example 34 may further include a main switch to disconnect said busbar from said mains branch circuit current supply.

In Example 43, the electrical subpanel system of Example 42, where said main switch may be open until a mains voltage is present at said quick-disconnect coupling.

In Example 44, the electrical subpanel system of Example 28, where the busbar may be configured to conduct an electrical current, $i_{Total}$, where $i_{Total}$ is defined by the relation $(i_{Total}=i_{Mains}+i_{Aux})$ and $i_{Mains}$ is the mains branch circuit current and $i_{Aux}$ is the current output by the inverter.

In Example 45, the electrical subpanel system of Example 42, where the current $i_{Total}$ may be less than or equal to 30 amps.

In Example 46, the electrical subpanel system of Example 28, where the DC electrical input to the inverter may be supplied by a primary power source.

In Example 47, the electrical subpanel system of Example 46, where the primary power source may be at least one of a photovoltaic system, a wind turbine, a geothermal system, a hydrogen fuel cell, a biofuel system, and a tidal energy system.

In Example 48, the electrical subpanel system of Example 46, where the DC electrical input to the inverter may be supplied by a secondary power source.

In Example 49, the electrical subpanel system of Example 46, where the secondary power source may be an electrical energy storage system.

In Example 50, the electrical subpanel system of Example 49, where the secondary power source may be at least one of a battery, a flywheel, a capacitive storage system, a compressed air energy storage system, a pumped-storage hydroelectric system, and a thermal energy storage system.

In Example 51, the electrical subpanel system of Example 50, where the DC electrical input to the inverter may be supplied by one of the primary power source or the secondary power source.

In Example 52, the electrical subpanel system of Example 34, where mains electrical panel tie-in may be an electrical utility tie-in.

In Example 53, an electrical circuitry board, which may include an electrical inverter; a direct current port connected to a first input of the electrical inverter; a backfeed controller port connected to a second input of the electrical inverter; at least two electrical lines connected to the electrical inverter and configured to transmit an alternating current generated by the electrical inverter; at plurality of alternating current ports electrically connected to the at least two electrical transmission lines; and a switch configured to electrically disconnect at least one of the plurality of alternating current ports from the at least two electrical transmission lines.

In example 54, an electrical circuitry board which may include an alternating current input port; a backfeed controller input port; a backfeed controller output port; at least two electrical lines connected to the alternating current input port; at plurality of alternating current ports electrically connected to the at least two electrical transmission lines; and a switch configured to electrically disconnect at least one of the plurality of alternating current ports from the at least two electrical transmission lines.

While the disclosure has been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. An electrical subpanel system, comprising:
    a DC/AC inverter configured to accept a DC electrical input and to provide an auxiliary AC current output;
    a quick-disconnect coupling;
    a busbar connecting the auxiliary AC current output and the quick-disconnect coupling;
    a receptacle for connecting at least one electrical device coupled to said busbar; and
    wherein the quick-disconnect coupling is configured to be connected to a mains branch circuit current,
    a branch circuit current limiting device interposed between the quick-disconnect coupling and the mains branch circuit current,
    wherein the branch circuit current limiting device is provided within a mains electrical panel,
    the mains electrical panel comprising:
    a main panel busbar; and
    a mains current supply,
    wherein said main panel busbar is connected to the branch circuit current limiting device.

2. The electrical subpanel system of claim 1, further comprising: a receptacle current limiting device connected between said busbar and said receptacle.

3. The electrical subpanel system of claim 2, wherein the inverter is hard-wired to the busbar.

4. The electrical subpanel system of claim 1, further comprising: a plurality of mains branch circuits; wherein each of the said plurality of mains branch circuits includes the branch circuit current limiting device interposed between a quick-disconnect coupling and the mains branch circuit current.

5. The electrical subpanel system of claim 1, wherein the busbar is configured to conduct an electrical current, $i_{Total}$, where $i_{Total}$ is defined by the relation ($i_{Total} = i_{Mains} + i_{Aux}$) and $i_{Mains}$ is the mains branch circuit current and $i_{Aux}$ is the current output by the inverter.

6. The electrical subpanel system of claim 5, wherein the current $i_{Total}$ is less than or equal to 30 amps.

7. The electrical subpanel system of claim 1, wherein the DC electrical input to the inverter is supplied by a primary power source.

8. The electrical subpanel system of claim 7, wherein the primary power source is at least one of a photovoltaic system, a wind turbine, a geothermal system, a hydrogen fuel cell, a biofuel system, and a tidal energy system.

9. The electrical subpanel system of claim 7, wherein the DC electrical input to the inverter is supplied by a secondary power source.

10. The electrical subpanel system of claim 1, wherein the system is configured to match the maximum voltage of the branch circuit to which it is connected.

11. An electrical subpanel system, comprising:
an electrical input configured to accept an auxiliary AC current;
a quick-disconnect coupling;
a busbar connecting the electrical input and the quick-disconnect coupling;
a receptacle for connecting at least one electrical device coupled to said busbar; and
wherein the quick-disconnect coupling is configured to be connected to a mains branch circuit current,
a branch circuit current limiting device interposed between the quick-disconnect coupling and the mains branch circuit current,
wherein the branch circuit current limiting device is provided within a mains electrical panel, the mains electrical panel comprising:
a main panel busbar; and
a mains current supply,
wherein said main panel busbar is connected to the branch circuit current limiting device.

12. The electrical subpanel system of claim 11, further comprising:
at least one solar panel;
a DC/AC inverter connected to an output of the solar panel and configured to accept a DC electrical input from said solar panel and to provide the auxiliary AC current; and
at least one backfeed measurement circuit;
wherein the electrical subpanel system is configured to be electrically coupled to a dedicated branch circuit of a mains circuit such that a maximum current rating for said dedicated branch circuit is not exceeded.

13. The electrical subpanel system of claim 12, further comprising: a backfeed controller connected to the backfeed measurement circuit; wherein the backfeed measurement circuit is coupled to the mains branch circuit.

14. The electrical subpanel system of claim 11, further comprising: a receptacle current limiting device connected between said busbar and said receptacle.

15. The electrical subpanel system of claim 14, wherein the inverter is hard-wired to the busbar.

16. The electrical subpanel system of claim 11, wherein the backfeed measurement circuit enables a net-metering configuration.

17. The electrical subpanel system of claim 11, wherein the net system backfeed to a utility tie-in is controlled to be zero.

18. The electrical subpanel system of claim 11, wherein the busbar is configured to conduct an electrical current, $i_{Total}$, where $i_{Total}$ is defined by the relation ($i_{Total} = i_{Mains} + i_{Aux}$) and $i_{Mains}$ is the mains branch circuit current and $i_{Aux}$ is the current output by the inverter.

19. The electrical subpanel system of claim 18, wherein the current $i_{Total}$ is less than or equal to 30 amps.

20. The electrical subpanel system of claim 11, wherein the DC electrical input to the inverter is supplied by a primary power source.

21. The electrical subpanel system of claim 20, wherein the primary power source is at least one of a photovoltaic system, a wind turbine, a geothermal system, a hydrogen fuel cell, a biofuel system, and a tidal energy system.

22. The electrical subpanel system of claim 20, wherein the DC electrical input to the inverter is supplied by a secondary power source.

23. The electrical subpanel system of claim 20, wherein the secondary power source is an electrical energy storage system.

* * * * *